United States Patent [19]

Clemmons, Quenten T.

[11] 4,175,793
[45] Nov. 27, 1979

[54] PARKING BRAKE CONTROL SYSTEM FOR RAILWAY VEHICLES

[75] Inventor: Clemmons, Quenten T., Irwin, Pa.

[73] Assignee: Westinghouse Air Brake Company, Wilmerding, Pa.

[21] Appl. No.: 947,970

[22] Filed: Oct. 2, 1978

[51] Int. Cl.² .............................................. B60T 17/16
[52] U.S. Cl. ......................................... 303/89; 91/44; 91/45; 92/17; 188/153 R; 188/265
[58] Field of Search ............. 303/89; 188/153 R, 265; 91/44, 45; 92/17

[56] References Cited

U.S. PATENT DOCUMENTS

| 2,531,055 | 11/1950 | Kirk | 188/153 R |
| 3,238,847 | 3/1966 | Moore | 303/89 |
| 3,746,403 | 7/1973 | Jones | 303/89 |

Primary Examiner—Reinhard J. Eisenzopf
Attorney, Agent, or Firm—R. S. Visk; R. W. McIntire, Jr.

[57] ABSTRACT

A parking brake for use primarily on railway vehicles of the mass transit type in conjunction with the service brake apparatus but operable independently thereof. A parking brake hydraulic cylinder is mechanically connected to the brake shoe hanger of the brake unit. After the vehicle has been brought to a stop, a parking brake application may be made by supplying pressure, by a handpump, to the hydraulic cylinder which also includes a lock-nut actuable by the pressure, in excess of a certain pressure for locking the parking brake hydraulic cylinder in its applied position. A relief valve is provided for relieving the hydraulic cylinder of hydraulic pressure when the application is to be released.

7 Claims, 1 Drawing Figure

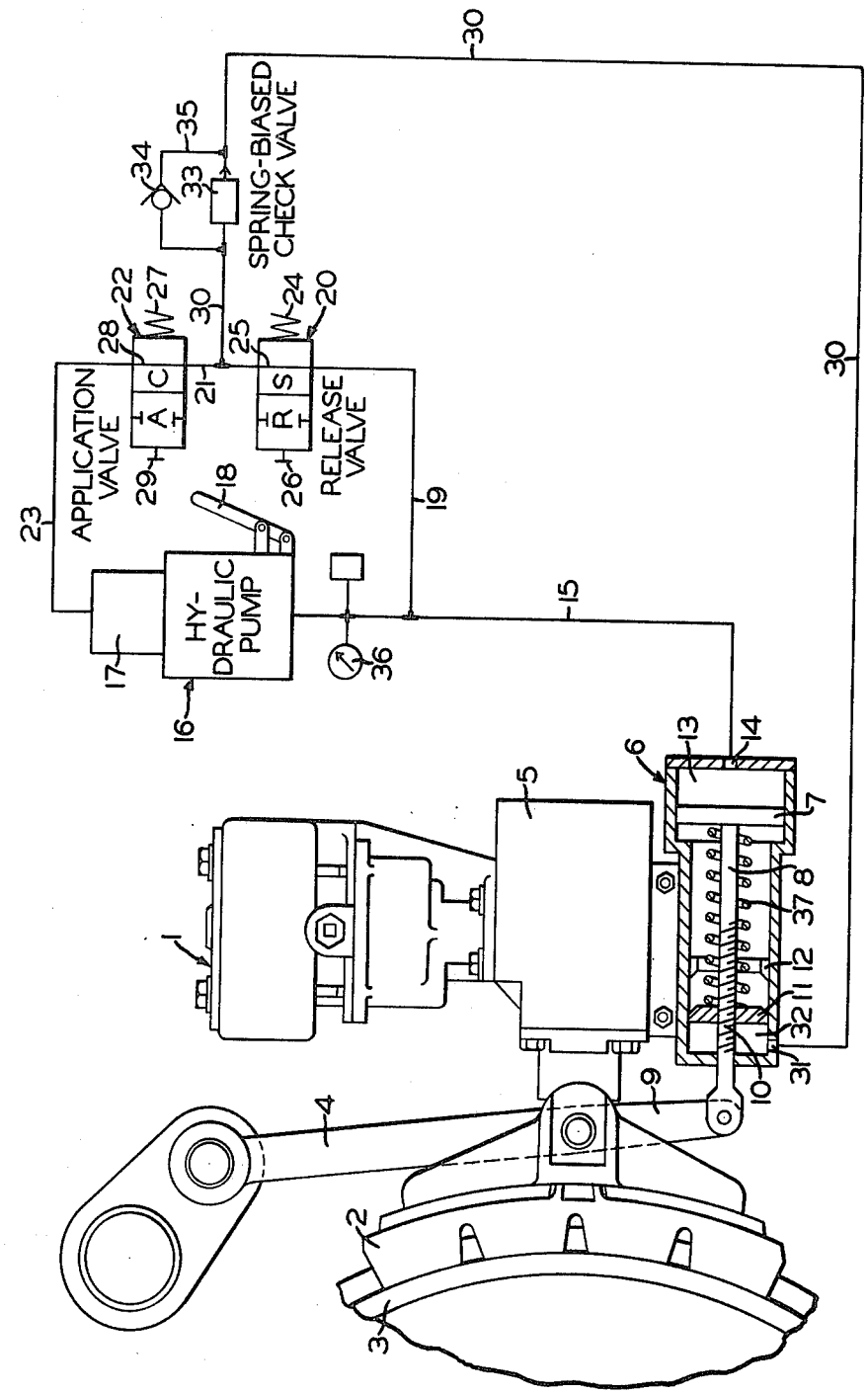

PARKING BRAKE CONTROL SYSTEM FOR RAILWAY VEHICLES

BACKGROUND OF THE INVENTION

In one presently known form of parking brake for use exclusively with disc brakes, a locking cylinder is hung between the tongs of the disc brake unit and is thereby actuated by the tongs during a normal service brake application. In another form for use both with disc-type or tread-type brakes, the locking cylinder is built integrally with the high pressure brake cylinder. In either case, the parking brake can then be set, following a brake application which brings the vehicle to a stop, simply by applying pressure to the locking port of the locking cylinder to cause the brake application to be locked up.

Normally, with the type of parking brakes above described, it is necessary to provide each of the brake units with a parking brake. Since on some types of vehicles such as those used for mass transit, it is not necessary to provide each brake unit with a parking brake, it would be desirable to provide parking brakes only on certain units necessary to provide the parking function and to make the parking brakes actuable independently of the service brake.

SUMMARY OF THE INVENTION

The object of the present invention, therefore, is to provide a parking brake apparatus capable of locking a tread brake unit in a brake-applied disposition but independently of the actuating cylinder of the service brake unit subsequently to a brake application thereby.

Briefly, the invention comprises a parking brake cylinder, preferably hydraulically operable, and including a piston having a piston rod connected to an extension of the brake shoe hanger, said piston and rod being effective, when subjected to hydraulic pressure by a hand pump, for exerting braking force of the brake shoe. A locking nut carried on the piston rod is actuated to a locking position for locking the piston and rod in a locked-up position in response to said hydraulic pressure exceeding a certain pressure. Once the piston and rod are in a locked-up position, the locking nut will hold them in said locked-up position, and the hydraulic pressure acting thereon is released via a relief valve. In order to release the lock-up disposition, pressure is momentarily applied to the piston for relieving the tension on the lock nut, whereupon a spring moves the lock nut to a normal unlocked position.

The single FIGURE drawing is primarily a schematic view of a parking brake control system embodying the invention.

DESCRIPTION AND OPERATION

As shown in the drawing, the numeral 1 generally designates a conventional tread brake unit including a brake shoe 2 for engaging the running surface of a railway vehicle wheel 3 which is carried in a conventional manner on a brake shoe hanger 4. Braking forces are applied to brake shoe 2, and consequently on wheel 3, by a fluid pressure operable actuator 5 conventionally mounted on a vehicle wheel truck (not shown).

In accordance with the invention, a locking cylinder device 6, preferably hydraulically operable, is suitably suspended underneath actuator 5 of the tread brake unit 1. Cylinder device 6 is provided with an operating piston 7 having a piston rod 8 extending therefrom and pivotally connected to an extension 9 of brake shoe hanger 4. Piston rod 8 has formed thereon a fast-pitch thread 10 on which a lock nut 11 is adapted to travel between an unlocked position, in which it is shown in the drawing, and a locked position in which it engages a friction clutch element 12, for example, axially fixed in cylinder device 6.

A piston pressure chamber 13 is formed in cylinder device 6 adjacent the side of piston 7 opposite rod 8, said chamber having an application port 14 opening thereto and connected via a cylinder pipe 15 to a source of fluid under pressure comprising a manually operable hydraulic pump 16 having a sump 17 and a handle 18 for manually operating said pump.

The parking brake apparatus, according to the invention, further comprises a release valve pipe 19 having one end connected to pipe 15 and the other end connected to a release valve device 20. A valve-connecting pipe 21 connects release valve device 20 to an application valve device 22, which, in turn, is connected via a return pipe 23 to sump 17 of hydraulic pump 16.

Release valve device 20, which is shown symbolically in the drawing, is biased by a spring 24 to an open or supply position, indicated S and as shown in the drawing, in which supply position pipe 19 is communicated via a passageway 25 to pipe 21. Release valve device 20 is provided with a handle 26, whereby said valve device may be operated to a release position in which communication between pipes 19 and 21 is interrupted, said release position being indicated R in the drawing.

Application valve device 22, which is shown symbolically in the drawing, is biased by a spring 27 to an open or communicating position in which it is shown in the drawing and in which pipes 21 and 23 are placed in communication via a passageway 28, said communicating position being indicated C in the drawing. Application valve device 22 is provided with a handle 29, whereby said valve device may be operated to an application position indicated A in the drawing and in which communication between pipes 21 and 23 is interrupted.

Valve-connecting pipe 21 is connected via a lock-nut pipe 30 to a locking port 31 opening to a lock-nut pressure chamber 32 formed cooperatively by lock-nut 11 and the end of locking piston 6 opposite piston pressure chamber 13. A spring-biased check valve 33 interposed in pipe 30 provides delay means for delaying supply of fluid pressure to lock-nut 11 until piston 7 and rod 8 have been operated to a brake-applied position, to be more fully described hereinafter, said check valve having a normally closed position and being set to open at a predesignated pressure, the direction of flow being indicated by the arrow. A one-way check valve 34 providing for free flow in a direction opposite to that of check valve 33, is disposed in parallel relation to check valve 33 in a pipe 35 connecting to pipe 30 on opposite sides of check valve 33.

A pressure gauge 36 is interposed in pipe 15, for a purpose to be hereinafter disclosed, between pump 16 and locking cylinder 6.

In operation, after the vehicle has been brought to a stop by brake unit 1, if it is desired to set the parking brake, the trainman or attendant uses handle 29 to operate application valve 22 to its application position A, and while holding said valve in said application position, uses pump 16 to pump up pressure until pressure gauge 36 indicates a predetermined operating pressure, as supplied to pressure chamber 13, sufficient for operating piston 7 and rod 8 in a left-hand direction, as viewed in the drawing, out of a brake release position, in which it is shown, to its brake-applied position in which brake shoe 2 is held firmly against wheel 3 for maintaining the brake application effected by service brake unit 1. The operating pressure thus generated by pump 16, after attaining the pressure setting of check valve 33, is also sufficient to cause said check valve to be opened, thereby causing said pressure to be transmitted via pipe 30 to lock-nut chamber 32 of locking cylinder 6. The predetermined operating pressure thus transmitted to lock-nut chamber 32 and acting on lock-nut 11 is also sufficient to cause said lock-nut to travel on fast-pitch thread 10, against opposition of a relatively light spring 37 compressed between said lock-nut and piston 7, until the lock-nut engages friction clutch element 12 to thereby lock the brake application on until released in a manner to be hereinafter described.

When the trainman observes on pressure gauge 36 that he has generated the necessary operating pressure, he releases handle 29, because by this time both piston 7 and lock-nut 11 will have operated to their applied and locking positions, respectively. With the brake application locked-in, the trainman may release handle 29 to allow valve device 22 to be restored to its communicating position so that all system pressure is connected to sump 17 and thereby relieved.

In order to release the parking brake, the attendant operates release valve 20 to its release position, thereby isolating locking cylinder 6 from the rest of the system. He then pumps up hydraulic fluid to a certain pressure greater than the operating pressure above discussed, or to a release pressure which is supplied via pipe 15 to chamber 13 of locking piston 6 and which has been predetermined sufficient for releasing pressure tension on lock-nut 11. With tension on lock-nut 11 relieved, spring 37 causes said lock nut to be spun on thread 10 to an unlocked position in which brake shoe 2 may be retracted from wheel 3 after the attendant restores release valve 20 to its open position S in which all hydraulic pressure is again transmitted to sump 17 via pipe 15, pipe 19, open release valve 20, pipe 21, open application valve 22, and pipe 23.

Having now described the invention, what I claim as new and desire to secure by Letters Patent, is:

1. Parking brake apparatus for use in conjunction with a tread brake unit of a railway vehicle including a brake shoe pivotally suspended on a brake shoe hanger through which braking forces are applied to the brake shoe, said parking brake apparatus comprising:
    (a) a locking cylinder device mechanically connected to the brake shoe hanger, said locking cylinder device having a normal release position in which braking forces on the brake shoe hanger are released, and being operable responsively to fluid pressure to an application position in which braking forces are applied to the brake shoe hanger;
    (b) fluid pressure supply means for supplying fluid pressure to said locking cylinder device for causing it to be operated to its said application position;
    (c) locking nut means in said locking cylinder device operable, when subjected to said fluid pressure from said fluid pressure supply means subsequently to operation of the locking cylinder device to its said braking position, to a locking position for maintaining the locking cylinder device in its said application position;
    (d) delay means interposed between said fluid pressure supply means and said locking nut means for allowing operation of the locking cylinder device to its said application position ahead of operation of the locking nut means to its said locking position; and
    (e) release valve means for effecting operation of said locking nut means to an unlocked position in which said locking piston device is released from its said application position.

2. Parking brake apparatus, as set forth in claim 1, wherein said delay means comprises a normally closed spring-biased check valve preset to open at a certain preselected pressure.

3. Parking brake apparatus, as set forth in claim 1, wherein said fluid pressure supply means comprises a manually operable hydraulic pump and a sump connected thereto.

4. Parking brake apparatus, as set forth in claim 3, wherein:
    (a) said locking cylinder device comprises a piston and piston rod operably connected to the brake shoe hanger, said piston being subjectable directly to fluid pressure from said pump via a cylinder pipe interconnecting the pump and the locking cylinder;
    (b) said release valve means comprises a release valve having a normal open position and interposed in a release valve pipe connecting said cylinder pipe to said delay means; and
    (c) said locking-nut means comprises a lock-nut screwably disposed on a fast-pitch thread formed on said piston rod and subjectable to fluid pressure from said pump via said release valve pipe, said normally open release valve, and said delay means interposed in a lock-nut pipe interconnecting said release valve and said lock-nut in parallel relation to said cylinder pipe.

5. Parking brake apparatus, as set forth in claim 4, further comprising a return pipe connecting said cylinder pipe, release valve pipe, and said lock-nut pipe to said sump for relieving said several pipes and the locking cylinder device of fluid pressure, and an application valve interposed in said return pipe and having a normally open position in which communication to said sump is open, said application valve being manually operable to a closed position for isolating said return pipe and sump from the remainder of the apparatus during pressure build-up by the pump.

6. Parking brake apparatus, as set forth in claim 4, wherein said locking-nut means further comprises a relatively light lock-nut spring for biasing said lock-nut toward its said unlocked position, and a friction clutch member engageable by the lock-nut when operated to its said locking position for retaining said lock-nut in said locking position until released.

7. Parking brake apparatus, as set forth in claim 6, wherein said release valve is interposed in said release valve pipe ahead of said delay means and is operable to a closed position for isolating said delay means and said lock-nut pipe from said locking cylinder, subsequently to operation of the lock-nut to its said locked position, for subjecting said piston to fluid pressure independently of the lock-nut and releasing tension thereon for rendering said lock-nut spring effective for operating the lock-nut to its unlocked position.

* * * * *